Figure 1:
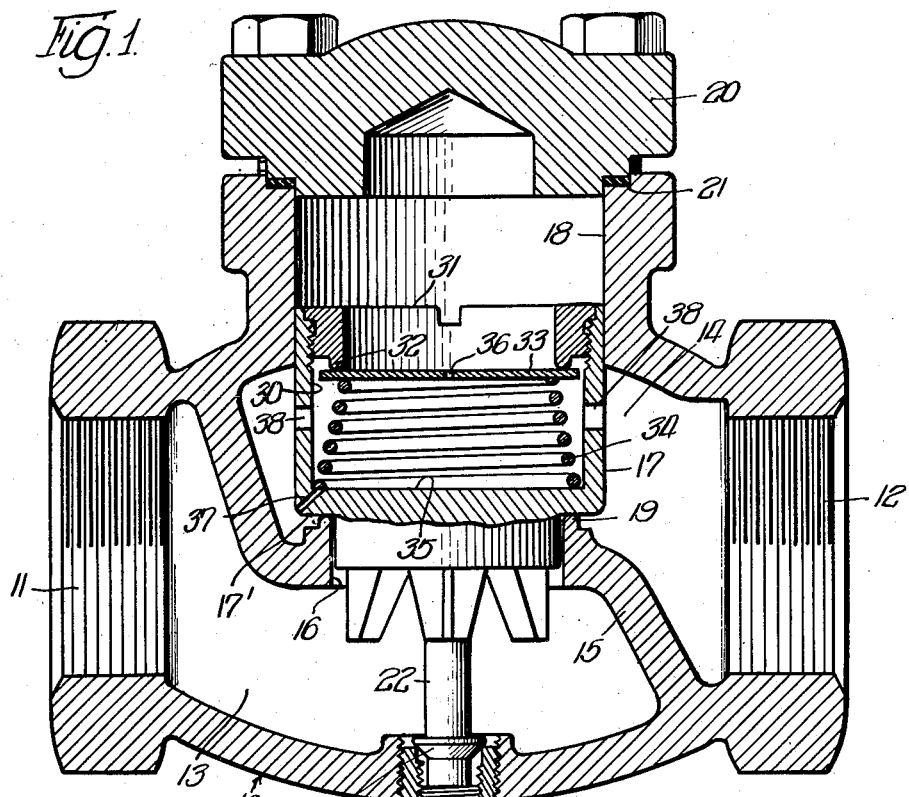

June 7, 1955 E. JONES 2,710,021

NON-CHATTER CHECK VALVE

Filed July 31, 1952

INVENTOR.
Evan Jones,
BY
Cromwell, Greist & Warden
Attys.

United States Patent Office 2,710,021
Patented June 7, 1955

2,710,021
NON-CHATTER CHECK VALVE

Evan Jones, Evanston, Ill., assignor to Henry Valve Company, Incorporated, Melrose Park, Ill., a corporation of Illinois Application July 31, 1952, Serial No. 301,943

4 Claims. (Cl. 137—514.5)

The present invention relates to an improved check valve construction. This construction is especially designed to dampen valve oscillations such as arise in a conventional check valve as the result of pulsation of a refrigerating system compressor with which the valve is associated, or the intermittent surges of a pulsating unit of a related check valve-controlled system, when the valve is discharging. The objectionable chatter which accompanies oscillatory action under this condition is effectively suppressed by the improved check valve, which is a piston or plunger type in the embodiment of the invention chosen for illustration.

In the conventional check valve of this type a piston, fitted to slide in a cylinder, lifts when a predetermined pressure differential arises between valve inlet and discharge chambers between which communication is normally shut off by a valve member movable with the piston, or a valve seat on the latter. As the piston lifts gas in the cylinder space thereabove is compressed, creating a compressed gas spring condition which tends to re-close the piston after its inertia has caused it to over-travel in the valve opening direction. As a consequence of this dashpot action the piston frequently oscillates and chatters when discharging to relieve the pressure on the intake side of its valve member.

It is therefore a general object of the invention to provide an improved check valve which is proof against chatter under the condition noted, functioning in a smooth, controlled fashion and free from violently pulsatory action, particularly under an oscillatory or pulsatory pressure differential between its intake and discharge sides.

More specifically, it is an object of the invention to provide a piston type check valve featuring a special diaphragm or disk which is normally spring urged to seal an auxiliary gas bleeder valve seat of the piston, but which unseats under the force of gas compressed thereabove when the check valve operates, thus bleeding and relieving the compressed gas cushion and allowing free lift of the piston and its valve member, accompanied by full capacity discharge past the latter, at a minimum pressure differential and even under a rapid or violently pulsatory condition at the inlet side of the valve member.

The foregoing statements are indicative in a general way of the nature of the invention. Other and more specific objects will be apparent to those skilled in the art upon a full understanding of the construction and operation of the device.

A single embodiment of the invention is presented herein for purpose of illustration. It will be appreciated that the invention may be incorporated in other modified forms coming equally within the scope of the appended claims.

Figure 2:
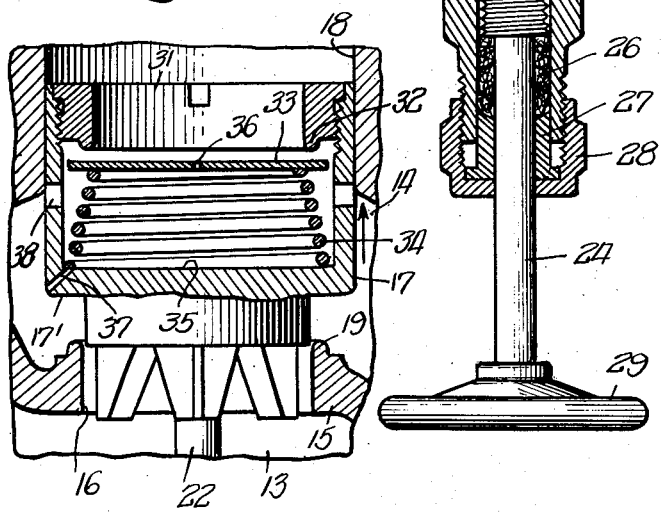

In the drawings:

Fig. 1 is a view in vertical cross section through a closed check valve embodying the invention; and Fig. 2 is a fragmentary view in section similar to Fig. 1, showing certain parts of the improved valve in discharging position.

Referring to the drawings, the reference numeral 10 generally designates a hollow, T-type valve body provided with threaded intake and discharge fittings or passages 11, 12, respectively, opening to internal intake and discharge chambers 13, 14, respectively of the valve. These chambers are separated by a transverse partition 15 integral with the valve body 10, and communication is adapted to be established between chambers 13, 14, through a vertically extending port 16.

A valve piston or plunger 17 is slidably received in a cylinder 18 of the valve, an integral annular valve seat shoulder 17' thereon gravitationally engaging an annular valve seat 19 of rounded cross section at the upper extremity of valve port 16 when the valve is in shut off condition, as in Fig. 1. A cap 20 closes the upper end of cylinder 18, with a compressible sealing gasket 21 interposed between the cap and valve body 10.

A rod-like tappet 22 depends coaxially from the piston 17, being engageable with the upper end 23 of an adjustable control stem 24. The latter is threadedly received in a sleeve-like guide 25, which is in turn fixedly secured, as by threading to the valve body 10, being coaxial with piston 17. Suitable packing 26 surrounds the stem within the guide and a packing gland 27 is adjustably manipulated by a threaded cap nut 28 on guide 25 to control the compression of the packing, as desired. Control stem 24 is rotatively manipulated by means of a handwheel 29 at its lower end. The function of stem 24 is to unseat the valve plunger or piston in the event of sticking thereof, or in the event free, unimpeded flow of fluid through port 16 in either direction is desired.

Piston 17 has a cylindrical interior chamber 30 coaxial therewith and an annular seat insert or ring 31 is threadedly received for adjustment in the upper extremity of this chamber. The insert is provided with an annular seat 32 of rounded cross section, seat 32 depending from the insert and adapted to be upwardly engaged by a relatively thin, flat metallic anti-chatter disk 33. A tapered coil compression spring 34 rests on the floor 35 of piston chamber 30 and urges disk 33 upwardly against seat 32. Disk 33 has a small gas bleeder opening 36 in the center thereof and a small drainage port 37 is formed through the floor of the piston for the discharge of liquids which may accumulate in the interior 30 over a considerable period of operation. The cylindrical wall of piston 17 is drilled to provide gas bleeder or vent ports 38 of substantial size, so located as to be exposed to valve discharge chamber 14 when the piston is engaged with its seat 19, as well as for a substantial portion of its throw away from that seat.

In operation of the improved check valve, an increase in pressure in intake chamber 13 causes piston 17 to rise from the seat 19, relieving the intake side through port 16. Attendant increase in gas pressure in piston cylinder 18 above the piston causes disk 33 to be forced downwardly away from its seat 32, with the result that the compressed gas is bled past the latter into the interior of piston chamber 30, whence it passes through the lateral piston ports 38 to the discharge chamber 14. A smooth, full stroke, free lift of the piston results, unimpeded by compressed gas dashpot action, so that instantaneous, full capacity correction of the pressure differential is made. After piston 17 has completed its full upward stroke, disk 33 is re-closed by spring 34 against seat 32; this now dampens the downward return stroke of the piston, preventing too-rapid and violent re-closing against seat 19. The net effect is a fast, instantaneous opening of the check valve under mild pressure differential and a smooth, controlled return stroke, whereby the objectionable chatter characteristic of existing piston type check valves is eliminated.

The position of the vent ports 38 on the piston wall is chosen so that they are sealed off by cylinder wall 18 at a predetermined rise of the piston. When this takes place, further escape of gas from above the piston and through ports 38 is prevented. Compression is relieved solely by a well throttled escape to the discharge through drain port 37. Inertia over-travel of the piston is dampened by mildly compressed gas thereabove; which acts to urge the piston downwardly at the extreme top of its stroke, with diminishing force due to bleeding through opening 36 and drain 37, until ports 38 are re-opened.

Final downward travel of the piston and re-opening of ports 38 takes place with the disk re-engaged with seat 32, the gas thereabove dropping in pressure to retard downward travel of the piston by dash pot action. Chamber 18 fills through opening 36 as the piston continues to reseated position, but maintains a dampening effect to counteract pressure pulsations on the check valve, whether imposed at its intake or discharge sides.

I claim:

1. A check valve comprising a hollow valve body providing a piston cylinder and intake and discharge passages adapted to be communicated with one another through a connecting valve port, a hollow, gravity loaded valve piston slidable in said cylinder and having a valve member movable gravitationally therewith into sealing relation to said port, an annular valve seat on said piston opening downwardly to the hollow interior of said piston, a bleeder port in said piston communicating said interior with said discharge passage, a bleeder disk in said piston, and a spring urging said disk upwardly into engagement with said valve seat, said disk being displaceable downwardly from said seat by gas compressed thereabove in said cylinder upon upward movement of said piston, thereby to communicate said cylinder with said discharge passage through said valve seat, the interior of said piston and said bleeder port, said piston being positionable in said cylinder to seal said bleeder port upon predetermined movement away from said valve port.

2. A check valve in accordance with claim 1 in which said disk has a vent hole therein.

3. A check valve comprising a hollow valve body having intake and discharge passages adapted to be communicated through a connecting valve port, a hollow valve plunger movable axially in said body into and out of sealing relation to said port, an annular valve seat on said plunger opening to the interior thereof, said plunger having a bleeder port communicating said interior with said discharge passage, means sealing said bleeder port upon predetermined movement of said plunger away from its sealing relation to said valve port, and a bleeder member associated with said plunger and yieldably urged toward sealing engagement with said valve seat as said plunger moves away from said valve port, said bleeder member being displaceable from said valve seat by gas compressed on one side thereof upon said movement of said plunger away from said valve port.

4. A check valve in accordance with claim 3, in which said bleeder member has an opening communicating said interior of said plunger with the interior of said body on the opposite side of said plunger.

References Cited in the file of this patent

UNITED STATES PATENTS

| 689,890 | Kull | Dec. 31, 1901 |
| 1,599,716 | Replogle | Sept. 14, 1926 |
| 2,057,624 | Burkhart | Oct. 13, 1936 |

FOREIGN PATENTS

| 436,431 | Great Britain | Oct. 10, 1935 |
| 17,862 | Germany | 1882 |